J. J. LONG.
KNOCKDOWN BOX.
APPLICATION FILED MAR. 29, 1911.

1,022,098.

Patented Apr. 2, 1912.
2 SHEETS—SHEET 1.

John J. Long,
INVENTOR

WITNESSES

Attorney

J. J. LONG.
KNOCKDOWN BOX.
APPLICATION FILED MAR. 29, 1911.
1,022,098.
Patented Apr. 2, 1912.
2 SHEETS—SHEET 2.
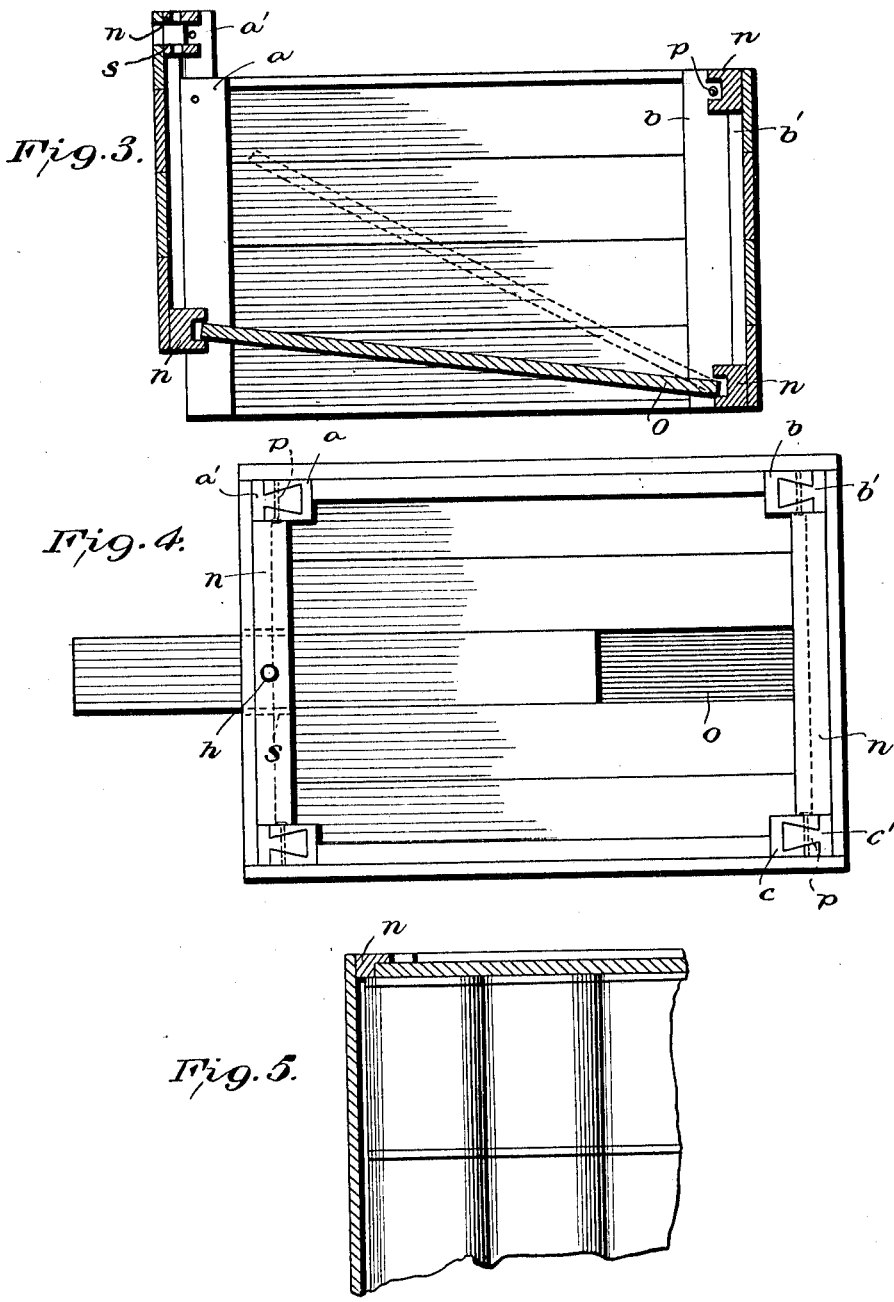
John J. Long,
INVENTOR
WITNESSES

UNITED STATES PATENT OFFICE.

JOHN J. LONG, OF NORFOLK, VIRGINIA.

KNOCKDOWN BOX.

1,022,098.  Specification of Letters Patent.  Patented Apr. 2, 1912.

Application filed March 29, 1911. Serial No. 617,778.

*To all whom it may concern:*

Be it known that I, JOHN J. LONG, a citizen of the United States, residing at Norfolk, in the county of Norfolk and State of Virginia, have invented new and useful Improvements in Knockdown Boxes, of which the following is a specification.

My invention relates to boxes of the knockdown type, and has to do with a box, the sides, ends, top and bottom of which can be separated from each other and laid flat one upon the other for the purpose of ready transportation in knock down condition.

The prime object of my invention is to produce a box in the assembly and disassembly of which it shall be unnecessary to use nails or other fastening means or special tools. Further the box of my invention may be assembled and disassembled by hand alone and without the assistance of tools.

Further objects of my invention are to produce a box in which the material is most efficiently utilized, and in which inexpensive material may be used very readily, to produce a box strong in construction and yet light in weight, and to produce a box which lends itself readily to temporary and partial opening for the purpose of inspection, sampling and display of the goods.

According to my invention I form the box of corner posts, each consisting of separably interlocked complemental portions, and secure the sides of the box and the ends of the box respectively to the complemental members of the posts, whereby the sides and ends are removably secured together by the separably interlocked members constituting the posts. I secure battens to the tops and bottoms of the side and end portions of the box which serve to hold the top and bottom of the box in place. The top of the box, and it may be the bottom, is put in place through a slot formed in one of the side or end walls immediately below the top battern of that wall, and I secure the top against removal by means passing transversely of the said slot.

In the accompanying drawings I show several specific embodiments of my invention. It may be given others without departing from its generic spirit.

Figure 1:
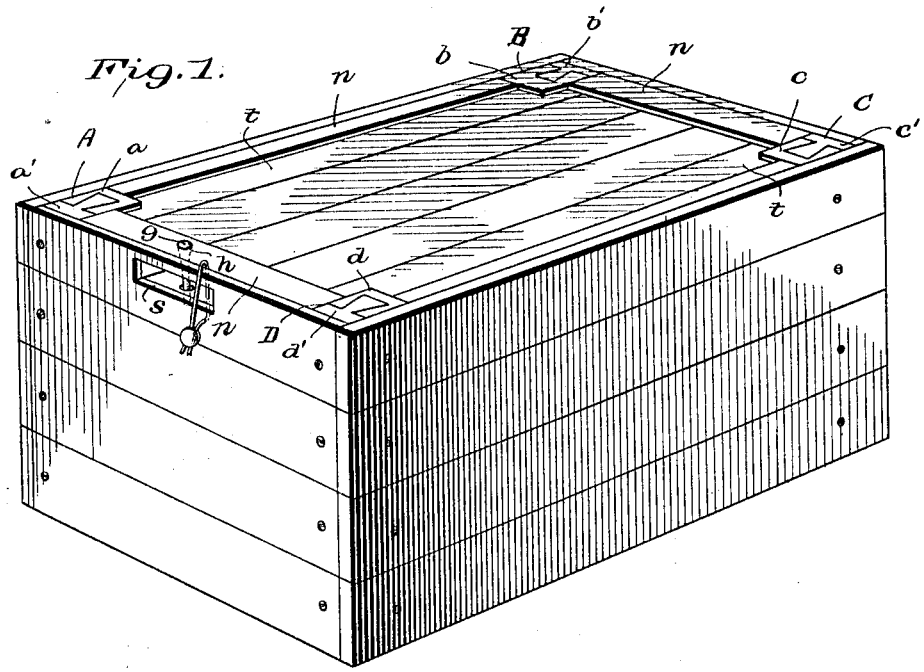
Figure 2:
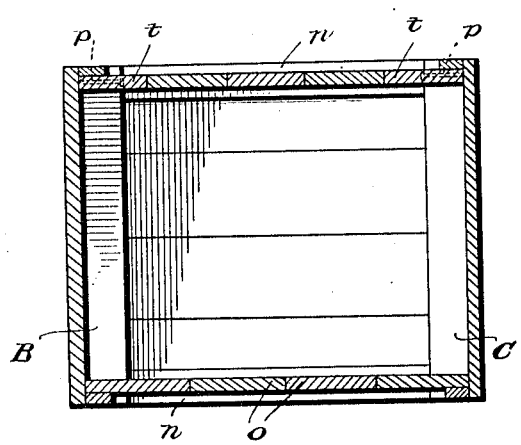

Of the drawings:—Figure 1 is a perspective view of the box of my invention assembled. Fig. 2 is a central transverse section. Fig. 3 is a side elevation with one side removed showing the manner of assembly and disassembly. Fig. 4 is a plan view showing the manner of applying the top of the box. Fig. 5 is a transverse section of the modified form of box.

Referring to the drawings, A, B, C, and D designate the corner posts. Each of these posts is divided lengthwise into two complemental members $a$, $a'$ $b$, $b'$, etc., the said complemental members being separably interlocked by means of a dovetailed joint between them, as shown. Thus the members, $a$, $b$, $c$, and $d$, may be slid longitudinally with respect to the members $a'$, $b'$, $c'$ $d'$. The opposite sides of the box are secured by screws, nails, or other means to the members $a$, $b$, and $c$, $d$, respectively, of adjacent pairs of posts, while the opposite ends of the box are secured in a similar manner to the complemental members $a'$, $d'$ and $b'$ $c'$. Thus, as is clearly apparent from Fig. 3, the sides and ends of the box are removably secured together by the interlocking complemental members of the corner posts. When the battens are of the single or non-grooved type, as shown in Fig. 5, and after the boards comprising the top of the box have been removed, any side or end may be slid vertically into or out of place with relation to the other side and end members. Preferably, although not necessarily as will appear hereinafter, I fix the sides and ends in their relative positions by means of pins $p$ passing through the complemental members of the posts, as shown clearly in Fig. 2.

Secured to the tops and bottoms of the side and end members, respectively, are battens $n$. These battens may or may not be double or grooved, as shown in Fig. 3, and in large boxes they are sometimes not double or grooved, being made single, as shown in Fig. 5. Resting on the inside of the lower battens is the bottom of the box which is formed of a plurality of boards $o$, the outermost ones of which are jogged to accommodate the corner posts. The bottom may be composed of a single board if desired. It is put in place in the assembly of the box as shown in Fig. 3, while the two sides and an end of the box are in their proper relative positions, the remaining end (of the four sided box) is lifted some distance. The bottom boards are then inserted as shown, their lower ends resting in the groove of the lower batten of one end and their upper ends on the outer edge of the lower batten of the other end. It will be observed that the side battens are made single. Thereafter the raised end of the box is slid down to its normal position, and the bottom of the box will be firmly socketed in the grooved lower battens of the ends of the box. The method of operation thus described is illustrated in Fig. 3.

The pins $p$ having been put in place immediately below the top battens, the box is ready for the placing of the top. In one of the end and side walls is a slot $s$ of a width preferably less than the width of the box, but as will be seen, this width depends directly upon the width of the cover boards. The cover boards are slipped through this slot and on the inside of the top battens, as clearly shown in Fig. 2 and in Fig. 1. They are shaped similarly to the bottom boards $o$. The outermost top boards $t$ bear against the heads of the pins $p$ and maintain the same in place, thus locking the interlocked complemental members of the corner posts in their assembled position.

After the last board of the top has been inserted in the slot a pin is placed transversely of the slot to secure them against removal. A hole $h$ is bored transversely of the top and bottom walls of the slot, and a wooden peg $g$, tapering in form, is driven into the hole and cut off at the top smoothly, as shown in Fig. 1. A further seal is provided by passage of an ordinary wire and lead sealing member through the apertures transversely of the outer portion of the slot, as shown in Fig. 1.

When it is desired to remove one board of the cover for the purpose of inspection, sampling or display, this may be readily done, and, as is obvious, the entire top or cover portion of the box may be similarly readily removed. The outer seal being disrupted the wooden peg may be cut off along the line of the upper wall of the slot, whereupon its lower end, which may be made to fit sufficiently loose in the hole in the lower wall of the slot, may drop through the hole, and the upper end of the peg may be driven downwardly into the slot and removed. The boards of the top cover slide easily and one or more of them may be readily slid off, as shown in Fig. 4.

Should it be desired, after removal of the contents of the box, to disassemble the same for shipping or storage, the cover having already been removed, the pins $p$ may be removed and one of the end walls simply lifted up, as shown in Fig. 3, whereupon the bottom of the box drops out, and the side and end walls may be slid apart most readily. The whole box may be then packed in flat and compact form.

The great advantages of the box of my invention at once appeal to the trade. Besides being of a knock down character and lending itself so readily to inspection, sampling, display and unpacking, besides being durable and strong in construction, it is extremely cheap to manufacture, practically the only additional material used over and above those used in large boxes at present made, being the battens. Furthermore the cheapest of materials may be used, it being possible to use boards of any width and of practically any quality, since the sides and ends are secured to the complemental post members by machinery, and there is during the manufacture no hand work necessarily done. All of the work necessary in the manufacture of the sides and ends and the attached complemental post members may be done in an ordinary nailing and stapling machine.

What I claim is:—

1. A knock-down box comprising sides, corner post members carried upon the extremities of the sides, ends fitting between the sides and having complemental post members interlocking with said first post members, battens carried upon the ends, a bottom removably held between the battens, pins engaging through the complemental post members to lock the same, and a detachable cover engaging against the heads of the pins to hold the same in position.

2. A knock-down box comprising sides, ends fitting between the sides and adapted for vertical sliding movement into and out of position, a bottom carried between the ends and held in position by the registration thereof, pins locking the ends in position, and a detachable cover upon the box engaging the pins to hold the same from displacement.

3. A knock-down box comprising sides, ends coöperating with the sides, interlocking complemental post members carried respectively on the sides and ends at their meeting edges, a bottom, retaining means disposed upon the ends engaging the bottom when the ends are in position, locking means engaging the post members to hold the same together, and a top carried on the sides and ends and engaging the locking means to hold the post members from separation whereby the ends and the bottom are held in set up position.

4. A knock-down box comprising sides, ends interfitting with the sides, a bottom removably carried between the ends, means carried by the ends for detachable engagement with the bottom, locking means engaging the sides and ends to hold the same together, and a cover interfitting with the sides and ends and engaging the locking means to insure the interlocking of the ends and sides.

5. A knock-down box comprising sides, ends interfitting with the sides, battens carrier at the upper and lower edges of the ends and adapted for registration when the ends are in position, a bottom engaging the lower battens and being held therein by the position of the ends, locking pins engaging the sides and ends to hold the same together and projecting into the upper battens, and a cover engaging in the upper battens and against the pins to secure the same from movement from the sides and ends whereby the bottom is held from displacement.

6. A knockdown box comprising sides and ends provided with upper and lower battens, the battens of the end members being grooved, a bottom removably fitting in the grooves of the lower battens, corner posts each composed of complemental separably interlocked members one member of each of which is connected to the sides of the box, and the other member of each of which is connected to the ends of the box, pins detachably engaging through the complemental post members to interlock the same, and hold the end members and the bottom in position, and a cover fitting in the upper battens engaging the pins to lock the same in position.

7. A knockdown box comprising sides, ends fitting between the sides and adapted for sliding movement into and out of position, a bottom carried between the ends, means disposed upon the ends engaging the bottom and adapted to secure the bottom in position when the ends are in position, locking members engaging the ends and the sides to hold the same together, and a detachable cover upon the box engaging the locking members to hold the same from displacement.

8. A knock-down box comprising sides, ends detachably connected with the sides, a bottom, retaining means carried by the ends for engagement with the bottom, locking pins engaging through the sides and ends to secure the same together, and a detachable cover for the box engaging the locking pins to hold the same from displacement.

9. In a knock-down box, sides, ends coöperating with the sides, interlocking complemental post members carried respectively at the meeting edges of the sides and ends locking pins engaging through the post members to hold the same together, a bottom, battens carried by the ends for detachably holding the bottom, and a cover engaging the pins to hold the same from displacement.

10. In a knockdown box, sides, ends, complemental post members carried at the meeting edges of the sides and ends, and adapted for interlocking sliding movement, battens carried at the upper and lower edges of the ends and having inwardly facing grooves, locking pins engaging through the complemental post members to secure the same together, the locking pins being arranged in longitudinal registration with the grooves in the battens, a removable bottom carried in the lower battens, and a detachable cover carried in the upper battens and having its edges engaging against the heads of the pin to hold the same from displacement.

In testimony whereof I have hereunto set my hand in presence of two subscribing witnesses.

JOHN J. LONG.

Witnesses:
J. B. W. TAYLOR,
F. P. WHITEHURST.

Copies of this patent may be obtained for five cents each, by addressing the "Commissioner of Patents, Washington, D. C."